(12) United States Patent
Sathe et al.

(10) Patent No.: US 8,838,999 B1
(45) Date of Patent: Sep. 16, 2014

(54) CUT-THROUGH PACKET STREAM ENCRYPTION/DECRYPTION

(75) Inventors: Satish Sathe, San Ramon, CA (US); Sundeep Gupta, Maharashtra (IN)

(73) Assignee: Applied Micro Circuits Corporation, Sunnyvale, CA (US)

( * ) Notice: Subject to any disclaimer, the term of this patent is extended or adjusted under 35 U.S.C. 154(b) by 262 days.

(21) Appl. No.: 13/109,620

(22) Filed: May 17, 2011

(51) Int. Cl.
*H04L 29/06* (2006.01)

(52) U.S. Cl.
USPC .......................................... 713/190; 726/34

(58) Field of Classification Search
USPC ............................................ 726/34; 713/190
See application file for complete search history.

(56) References Cited

U.S. PATENT DOCUMENTS

| | | | | |
|---|---|---|---|---|
| 5,469,433 | A * | 11/1995 | McAuley | 370/474 |
| 5,761,433 | A * | 6/1998 | Billings | 709/231 |
| 5,835,599 | A | 11/1998 | Buer | |
| 6,233,253 | B1 * | 5/2001 | Settle et al. | 370/474 |
| 6,253,321 | B1 | 6/2001 | Nikander et al. | |
| 6,977,941 | B2 * | 12/2005 | Takahashi et al. | 370/412 |
| 7,174,432 | B2 * | 2/2007 | Howard et al. | 711/147 |
| 7,290,134 | B2 * | 10/2007 | Buer et al. | 713/160 |
| 7,363,353 | B2 * | 4/2008 | Ganesan et al. | 709/218 |
| 7,424,666 | B2 * | 9/2008 | Chandwani et al. | 714/799 |
| 7,546,399 | B2 * | 6/2009 | Varma et al. | 710/52 |
| 7,599,456 | B1 * | 10/2009 | Chi et al. | 375/354 |
| 7,895,412 | B1 * | 2/2011 | Kerr et al. | 712/14 |
| 8,064,600 | B2 * | 11/2011 | Bates et al. | 380/255 |
| 8,503,891 | B2 * | 8/2013 | Mashimo et al. | 398/209 |
| 2003/0039354 | A1 * | 2/2003 | Kimble et al. | 380/37 |
| 2004/0247129 | A1 * | 12/2004 | Patariu et al. | 380/277 |
| 2004/0250096 | A1 * | 12/2004 | Cheung et al. | 713/193 |
| 2005/0278548 | A1 * | 12/2005 | Lin et al. | 713/189 |
| 2006/0072598 | A1 * | 4/2006 | Haywood | 370/412 |
| 2007/0098155 | A1 * | 5/2007 | Nagasawa et al. | 380/33 |
| 2008/0212577 | A1 | 9/2008 | Abel et al. | |
| 2009/0185575 | A1 | 7/2009 | Iwata et al. | |
| 2009/0327826 | A1 | 12/2009 | Inoue et al. | |
| 2010/0223435 | A1 | 9/2010 | Jones | |
| 2012/0076298 | A1 * | 3/2012 | Bolotov et al. | 380/255 |

OTHER PUBLICATIONS

Steve Friedl's Unixwiz.net Tech Tips; An Illustrated Guide to IPsec; Accessed Nov. 27, 2012; First published: Aug. 24, 2005.*
Packet Filtering in Gigabit Networks Using FPGAs; Johannes Loinig et al.; Institute for Applied Information Processing and Communications Graz University of Technology; 2007.*
Cisco IOS Quality of Service Solutions Configurations Guide, Release 12.2SR—Congestion Management; 2007 Cisco Systems Inc.*

* cited by examiner

*Primary Examiner* — Bradley Holder
*Assistant Examiner* — James Turchen
(74) *Attorney, Agent, or Firm* — Amin, Turocy & Watson, LLP (57) ABSTRACT

A system and method are provided for the cut-through encryption of packets transmitted via a plurality of input/output (IO) ports. A system-on-chip is provided with a first plurality of input first-in first out (FIFO) memories, an encryption processor, and a first plurality of output FIFOs, each associated with a corresponding input FIFO. Also provided is a first plurality of IO ports, each associated with a corresponding output FIFO. At a tail of each input FIFO, packets from the SoC are accepted at a corresponding input data rate. Packet blocks are supplied to the encryption processor, from a head of each input FIFO, in a cut-through manner. The encryption processor supplies encrypted packet blocks to a tail of corresponding output FIFOs. The encrypted packet blocks are transmitted from each output FIFO, via a corresponding IO port at a port speed rate effectively equal to the corresponding input data rate.

22 Claims, 8 Drawing Sheets

CUT-THROUGH PACKET STREAM ENCRYPTION/DECRYPTION

BACKGROUND OF THE INVENTION

1. Field of the Invention

This invention generally relates to digital communications and, more particularly, to an inline packet encryption and decryption system capable of handling multiple independent packet streams using a single shared higher speed encryption engine

2. Description of the Related Art

In a conventional system-on-chip (SoC), the Ethernet networking interface can be configured as either a small number of high speed interfaces or a larger number of slower speed interfaces. For example, a particular SoC may support configuration as a single 10 gigabits per second (Gbps) Ethernet port, or four 1 Gbps Ethernet ports, with both configurations sharing the interface pins, a common system side interface, and a shared internal data path, and other acceleration capabilities such as TCP/UDP checksum processing, packet classification, etc. Such an SoC may additionally support inline Internet protocol security (IPsec) and IEEE 802.1AE (MACsec) processing as well.

Many architectures dedicate encryption and decryption engines to each port, which increases die size. Dedicated encryption/decryption engines result in poor overall resource utilization since only the high speed interfaces or the low speed interfaces can be used at any one particular moment. However, both interfaces cannot be used simultaneously, since they share interface pins, system interface, and other acceleration capabilities.

Figure 1:
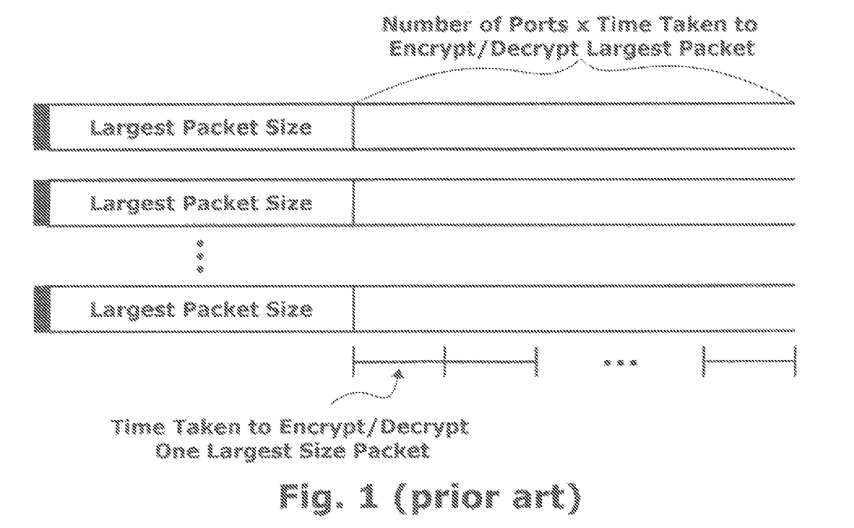
FIG. 1 is a diagram depicting a plurality of packets pending at different SoC input/output (IO) ports (prior art).

FIG. 1 is a diagram depicting a plurality of packets pending at different SoC input/output (IO) ports (prior art). Other architectures may share the same encryption and decryption engine between the two configurations. In this case, an arbitration scheme is implemented to switch between one port (e.g., one of the lower speed ports) to encrypt or decrypt a packet on that port, and then switch to another port that may have a pending packet. Since packet sizes can vary, each low speed port must provide enough buffering for the largest size packet, in case all ports receive packets simultaneously. This buffering must be at least as large as the largest supported packet size, plus the number of ports, times the time taken to encrypt/decrypt the largest supported packet size. This additional buffering is necessary to handle the case where all ports receive the largest packet size at the exact same time, and the last port to get serviced must wait till all other port packets have been processed.

Typically, additional buffering is necessary in order to overcome arbitration latencies and other processing inefficiencies. For example, if a 10 Gbps encryption/decryption engine is being shared between 10 Ethernet ports, each running at 1 Gbps, and all ports support 9.6 kilobyte (Kbyte) Jumbo frames, then each port must provide at least 19.2 Kbytes of buffering at the input in order to guarantee that all packets can be processed by the shared encryption/decryption engine without experiencing buffer overflow conditions.

Another drawback is that while the encryption/decryption engine operates at a 10 Gbps throughput, each outgoing low speed port may only be able to process the data at 1 Gbps. Since the encryption/decryption engine operates 10 times faster, each low speed port must also provide an output buffer into which it can store the results of the encryption/decryption engine so that its buffers do not overflow. For example, the transmit direction of the 1 Gbps Ethernet port only transmits packets at 1 Gbps, but the encryption engine writes data into the output buffer at 10 Gbps. Thus, in addition to requiring large input buffering per port, an additional minimum of output buffering per slow speed output port is also required. Therefore, in a system that has ten 1 Gbps Ethernet ports, the total minimum buffering required is:

10 (ports)×2 (input buffer+output buffer)×2 (receive path+transmit path)×19.2 Kbytes=768 Kbytes of memory.

It would be advantageous if an encryption or decryption engine could be shared between multiple ports while minimizing the amount the required buffer memory.

SUMMARY OF THE INVENTION

Disclosed herein is an inline packet encryption and decryption system capable of managing multiple independent packet streams using a single shared higher speed encryption engine. In one aspect, the system shares a single high bandwidth encryption and decryption engine between a single high bandwidth data stream and multiple lower bandwidth data streams. For example, the encryption/decryption engine may operate at a 128-byte block interleaving level, instead of at a packet level. For every port that is selected, the engine processes 128 bytes from that port, then puts aside the encryption state variables for that port, and arbitrates for the next port that may have a packet pending. By interleaving at the 128 byte level, instead of at a packet level, the encryption/decryption engine is able to drastically reduce the input and output packet buffering requirements. Another advantage is that the worst case latency for any port is now reduced to 10×2×(time to process 128 bytes).

This technique significantly reduces buffering requirements for the data streams when compared to other approaches, while reducing latency and eliminating interdependency between the multiple data streams. It allows reuse of the logic between both modes of operation, thereby reducing gate count and power.

Accordingly, in a system-on-chip (SoC), a method is provided for the cut-through encryption of packets transmitted via a plurality of input/output (IO) ports. An SoC is provided with a first plurality of input first-in first out (FIFO) memories, an encryption processor, and a first plurality of output FIFOs, each associated with a corresponding input FIFO. Also provided is a first plurality of IO ports, each associated with a corresponding output FIFO. At a tail of each input FIFO, packets from the SoC are accepted at a corresponding input data rate. Note: the data rate associated with each input FIFO need not be the same. Packet blocks are supplied to the encryption processor, from a head of each input FIFO, in a cut-through manner. A packet block is a segment of data that is less than, or equal in size to a packet. The term "cut-through" is intended to describe a process that supplies less than complete packets to the encryption processor. In this manner, the encryption processor may parallely process a plurality of packets while minimizing the amount of buffering that is required.

The encryption processor supplies encrypted packet blocks to a tail of corresponding output FIFOs (each output FIFO is associated with a corresponding input FIFO). The encrypted packet blocks are transmitted from a head of each output FIFO, via a corresponding IO port at a port speed rate effectively equal to the corresponding input data rate. Note: the port speed rates may be slightly faster than the rates at which the input FIFOs are loaded, to accommodate the additional overhead required for encryption.

Additional details of the above-described method, a method for cut-through decryption, as well cut-through encryption and decryption systems are provided below.

DETAILED DESCRIPTION

Figure 2:
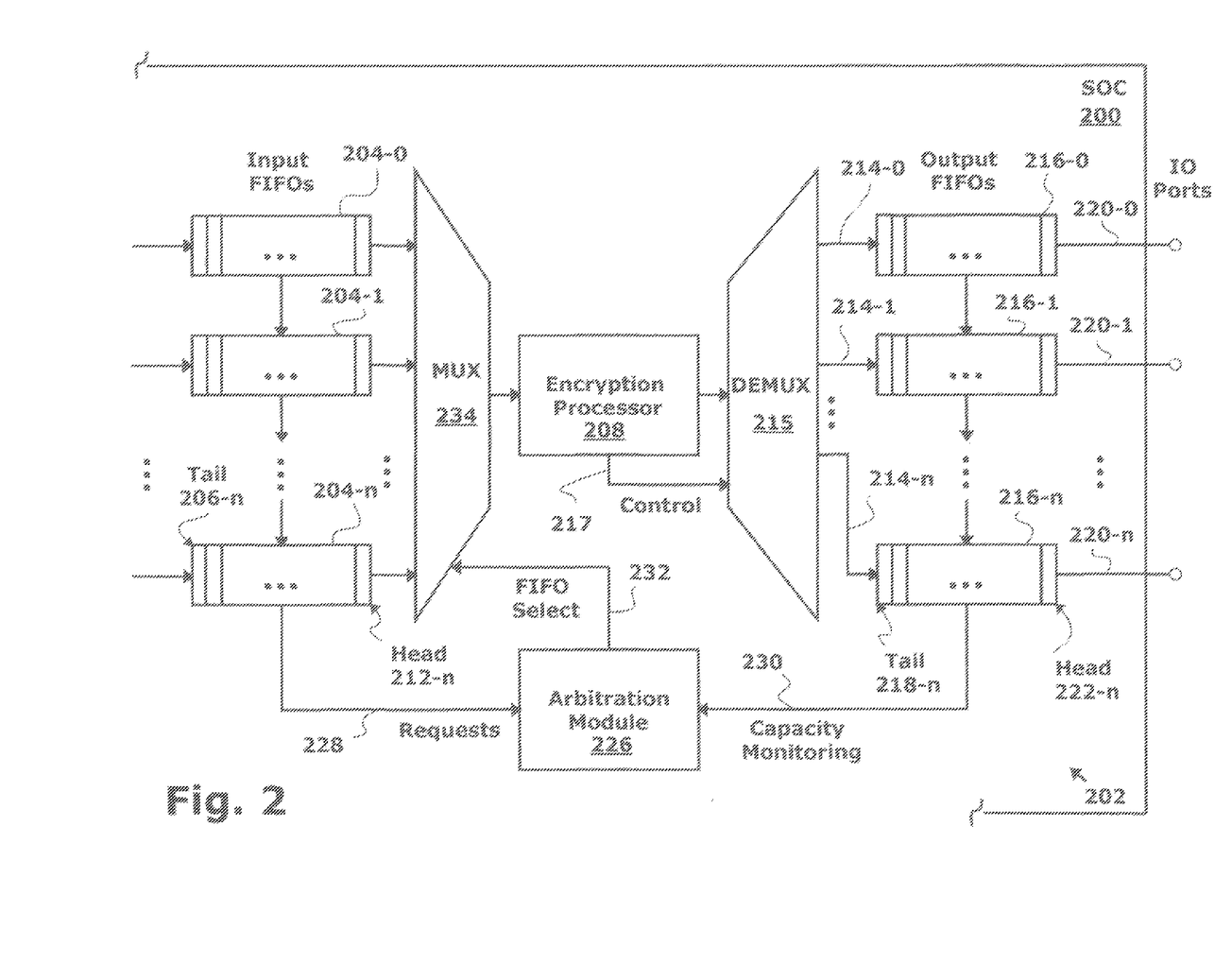
FIG. 2 is a schematic block diagram of a system-on-chip (SoC) with a system for the cut-through encryption of packets transmitted via a plurality of input/output (IO) ports.

FIG. 2 is a schematic block diagram of a system-on-chip (SoC) 200 with a system for the cut-through encryption of packets transmitted via a plurality of input/output (IO) ports. The system 202 comprises a first plurality of input first-in first out (FIFO) memories 204-0 through 204-n, where n is an integer variable not limited to any particular value. Each input FIFO 204 has a tail 206 to accept packets from the SoC 200 at a corresponding input data rate. Note: the input data rates in the input FIFOs 204 are not necessarily all the same rate. Generally, a packet block is a segment of data that is less than, or equal in size to a packet. In one aspect, the packet block is defined as a segment of m bytes, where m is fixed integer variable, or as a partial block including an end of a packet. In another aspect, the input FIFOs 204 accept Internet Protocol Security (IPsec) Encapsulating Security Protocol (ESP) packets in a transport or tunnel mode.

An encryption processor 208 has an input on line 210 to accept packet blocks from a head 212 of each input FIFO 204, and has an output on line 214 to supply encrypted packet blocks, in a cut-through manner, via demultiplexer (DEMUX) 215 in response to commands on control line 217 from the encryption processor. The term "cut-through" is intended to describe the transport of less than complete packet (i.e. a packet block).

The system 202 further comprises a first plurality of output FIFOs 216-0 through 216-n, each associated with a corresponding input FIFO 204. Each output FIFO 216 accepts encrypted packet blocks at a tail 218. A first plurality of IO ports 220-0 through 220-n, each receive the encrypted packet blocks from a head 222 of a corresponding output FIFO 216. Each IO port 222 transmits the encrypted packet blocks at a port speed rate effectively equal to the corresponding input data rate. Note: the port speed rates may be slightly faster than the rates at which the corresponding input FIFOs are loaded, to accommodate the additional overhead required for encryption.

In one aspect, the system 202 comprises an arbitration module 226 having a first interface on line 228 to accept requests from the input FIFOs 204, where each request indicates the accumulation of a packet block. The arbitration module 226 has a second interface on line 230 to monitor output FIFO capacity, and a third interface on line 232 to select an input FIFO in response to determining that a corresponding output FIFO has the capacity to store an encrypted packet block. As shown, a multiplexer (MUX) 234 is the FIFO selection means.

In one aspect, the arbitration module 226 receives a request from a plurality of input FIFOs 204 and selects a first input FIFO (e.g., 204-0) in response to comparing the input data rates at which the input FIFOs accept packets from the SoC. For example, the arbitration module 226 may give priority to an input FIFO associated with a higher data rate. Alternatively, the selection may be made on the basis of fairness or guaranteed quality-of-service.

Figure 3:
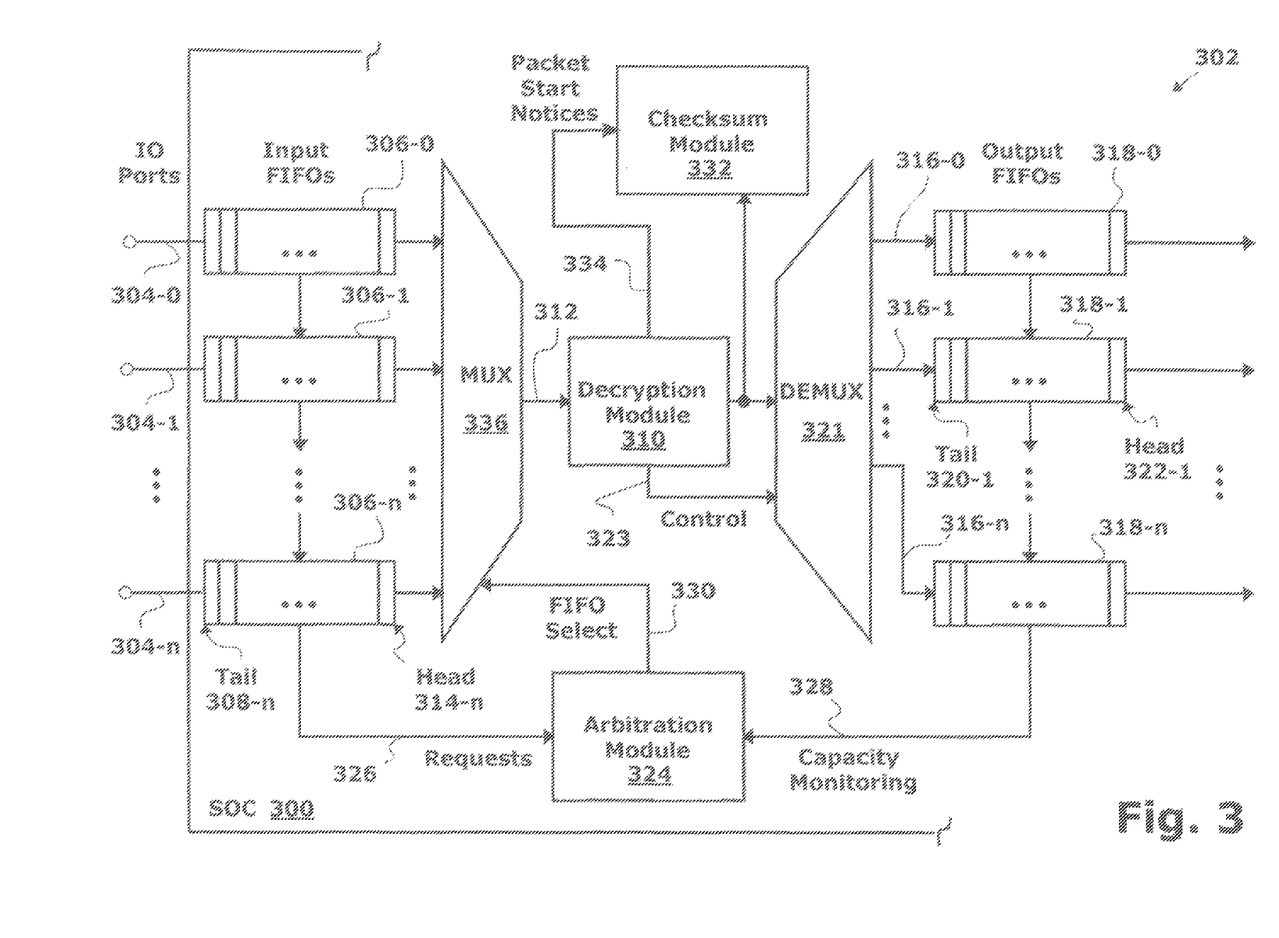
FIG. 3 is a schematic block diagram of a SoC with a system for the cut-through decryption of packets received via a plurality of IO ports.

FIG. 3 is a schematic block diagram of a SoC 300 with a system for the cut-through decryption of packets received via a plurality of IO ports. The system 302 comprises a first plurality of IO ports 304-0 through 304-n. The system 302 also comprises a first plurality input FIFO memories 306-0 through 306-n. Each input FIFO 306 has a tail 308 to accept packets via a corresponding IO port 304 at a corresponding port speed data rate. A packet block is defined as a segment of m bytes, where m is fixed integer variable, or as a partial block including an end of a packet. In one aspect, the input FIFOs 306 accept IPsec ESP packets in a transport or tunnel mode.

A decryption processor 310 has an input on lines 312 to accept packet blocks from a head 314 of each input FIFO 306. The decryption processor 310 has an output on line 316 to supply decrypted packet blocks, in a cut-through manner. A first plurality of output FIFOs 318-0 through 318-n, each associated with a corresponding input FIFO 306, accept the decrypted packet blocks at a tail 320, via DEMUX 321 in response to a control signal on line 323 from the decryption processor 310. The output FIFOs 318 supply the decrypted packet blocks to the SoC 300 from a head 322 at an output data rate effectively equal to the corresponding port speed data rate. Note: the port speed rates may be slightly faster than the rates at which the corresponding input FIFOs are unloaded, to accommodate the decryption overhead, which is removed from the packets.

In one aspect, an arbitration module 324 has a first interface on line 326 to accept requests from the input FIFOs 306, where each request indicates the accumulation of a packet block. The arbitration module 324 has a second interface on line 328 to monitor output FIFO 318 capacity, and a third interface on line 330 to select an input FIFO 306 in response to determining that a corresponding output FIFO 318 has the capacity to store a decrypted packet block. In one aspect, the arbitration module 324 receives a request from a plurality of input FIFOs 306 and selects a first input FIFO in response to comparing the input data rates at which the input FIFOs 306 accept packets via the IO ports 304. For example, the arbitration module 324 may give priority to an input FIFO associated with a higher data rate. Alternatively, the selection may be made on the basis of fairness or guaranteed quality-of-service. As shown, a MUX 336 is the FIFO selection means.

In another aspect, the system 302 further comprises a checksum module 332 having an interface on line 316 to accept each decrypted packet block. The checksum module 332 also has an interface on line 334 to accept packet start notifications from the decryption processor 310. The decryption processor supplies packet start notifications to the checksum module 332 at the beginning each packet. The checksum module 332 performs a checksum operation on packet blocks associated with each packet supplied to an output FIFO 318.

For example, the decryption processor 310 may determine that a first packet, associated with input FIFO 306-0, is either a transmission control protocol (TCP) or user datagram protocol (UDP) checksum protocol. The checksum module 332 compares a calculated first packet checksum to a stored checksum, which is part of the packet, in response to the first packet being a checksum protocol. However, the checksum module 332 discards the checksum in response to the first packet not being a checksum protocol.

In another aspect, each output FIFO 318 has a capacity of (x+1) bytes. If an input FIFO 306 accepts a packet with a non-predetermined padding segment including a variable number of bytes, not exceeding x bytes, the decryption processor 310 notifies the checksum module 332 of the number of bytes in a first packet padding segment. Then, the checksum module 332 excludes the first packet padding segment from the checksum calculation.

Functional Description

The encryption/decryption engines depicted in FIGS. 2 and 3 supports IPsec and MACsec data path processing. Specifically, advanced encryption standard—Galois/counter mode (AES-GCM) and AES-GMAC encryption and authentication algorithms for the IPsec encapsulating security protocol (ESP) is supported, and IPsec transport as well as tunnel modes. The system does not explicitly support fragmented IP packets. However, if IP fragments are reassembled prior to sending them to the engine, then the engine can support the processing of reassembled packets. Other block level encryption algorithms can also be supported using the same architecture.

Figure 4:
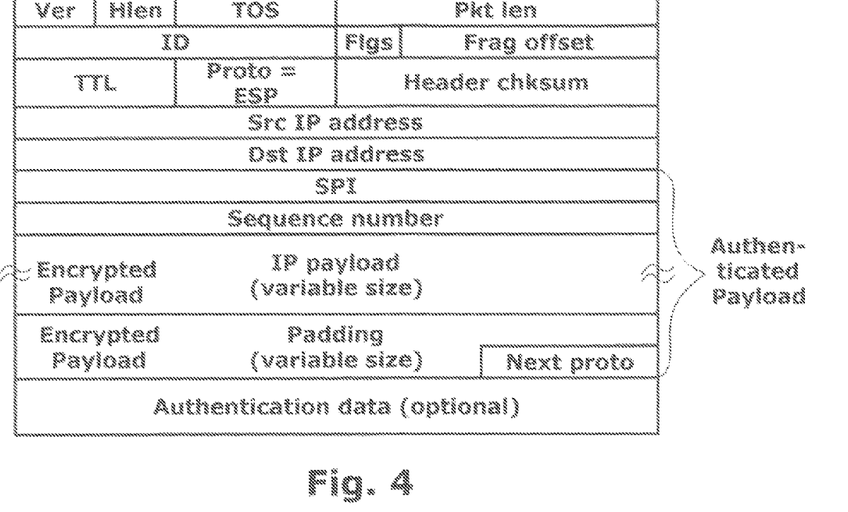
FIG. 4 is a diagram of an IPv4 packet in ESP transport encapsulation.

FIG. 4 is a diagram of an IPv4 packet in ESP transport encapsulation.

Figure 5:
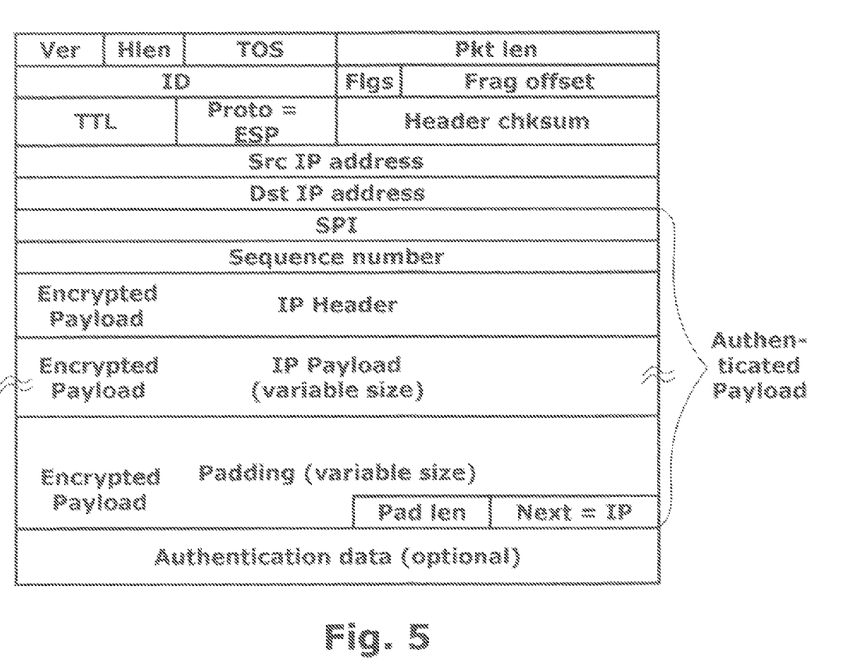
FIG. 5 shows an IPv4 packet in ESP tunnel mode encapsulation.

FIG. 5 shows an IPv4 packet in ESP tunnel mode encapsulation. AES is a block level symmetric key encryption standard that operates on 128 bit, 192 bit, and 256 bit keys.

Figure 6:
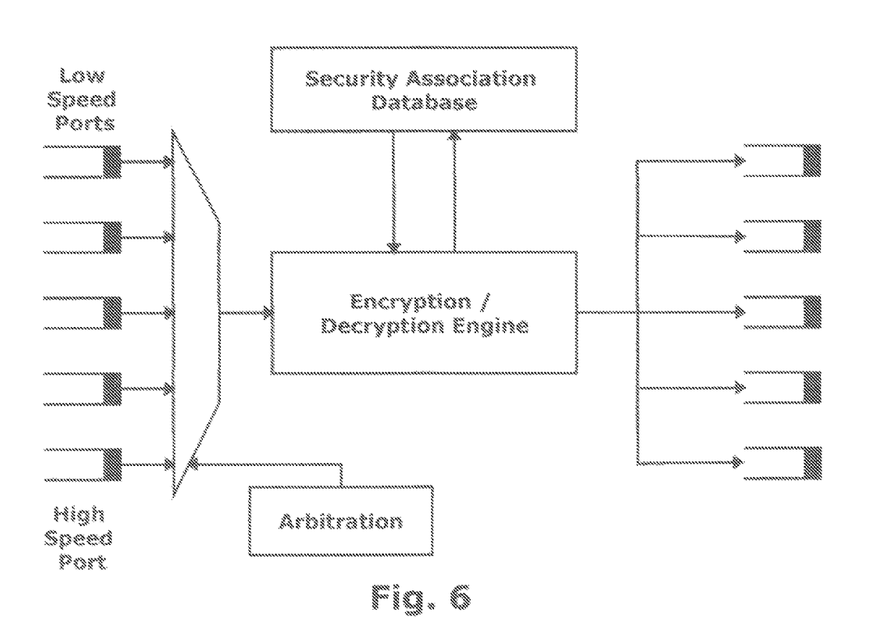
FIG. 6 is a schematic block diagram depicting an example of the systems of FIGS. 2 and 3.

FIG. 6 is a schematic block diagram depicting an example of the systems of FIGS. 2 and 3. Each input FIFO generates a request signal whenever it has a configured amount (or more) of data, or at least one end-of-packet block. In one implementation the configured data amount is set to 128 bytes. However, this amount can be set to any value above 64 bytes, since this is the smallest valid Ethernet packet. This request is forwarded to an arbitration state machine that implements a round robin arbitration for selecting between all the requesters. Any arbitration scheme can be selected as long as it guarantees that the input and output FIFOs do not overflow. Before granting a request, the arbitration logic must insure that the output FIFO for that port can accommodate the data after the encryption/decryption engine is done. The output FIFO for that port must be able to store the results of the engine. Otherwise, the engine must stall until there is room in the output FIFO. If the output FIFO is drained at 1 Gbps, and if the engine has to wait for the FIFO to have capacity, the engine effectively has to operate at 1 Gbps until there is room in the FIFO.

Additionally, this checking becomes important because the encryption process usually expands the packet size. For example in IPsec, the engine must add encryption headers to the packet and may pad the end of the packet as well (see FIGS. 4 and 5). To account for this expansion, the arbitration scheme must check that the output FIFO can accommodate the data as well as the worst case packet expansion. The worst case packet expansion at the beginning of the packet occurs in ESP tunnel mode when a new, outer IP header is added to the packet. For example if no IPv4 options are included in the outer header, this packet expansion is bound to 28 bytes (the 20 byte IPv4 header, the 4 byte SPI, and 4 byte sequence number). The worst case packet expansion at the end of the packet occurs when a packet is padded with a variable amount of padding in order to align the end of the packet to a 4 byte boundary, and also to hide the exact packet size of the encrypted packet. The maximum padding that can be added to the packet is 255 bytes.

Additionally, optional authentication data may be appended to the packet if authentication is also implemented (see FIG. 5). The output FIFO must be sized to accommodate the maximum packet expansion that is supported by the encryption/decryption engine. For example, an output FIFO of 384 bytes per port can support IPv4 packets without outer header options and a padding length of 255 bytes. This output FIFO capacity is only needed if packets are being encrypted, as packet decryption actually removes some of this overhead and results in a smaller output packet. For the example used above, the system would require input buffering of 10×128=1.25 Kbytes and output buffering of 10×384=3.75 Kbytes, or a total of 5 Kbytes, as opposed to 768 Kbytes if Jumbo frames are supported.

Figure 7:
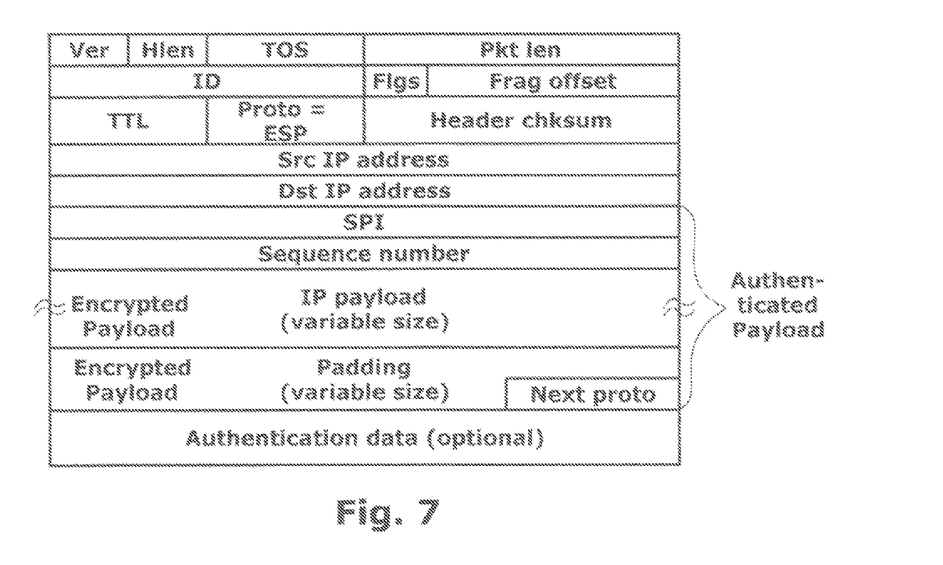
FIG. 7 is a diagram depicting IPSec ESP Transport Mode Next Protocol Field Location.

FIG. 7 is a diagram depicting IPSec ESP Transport Mode Next Protocol Field Location.

Figure 8:
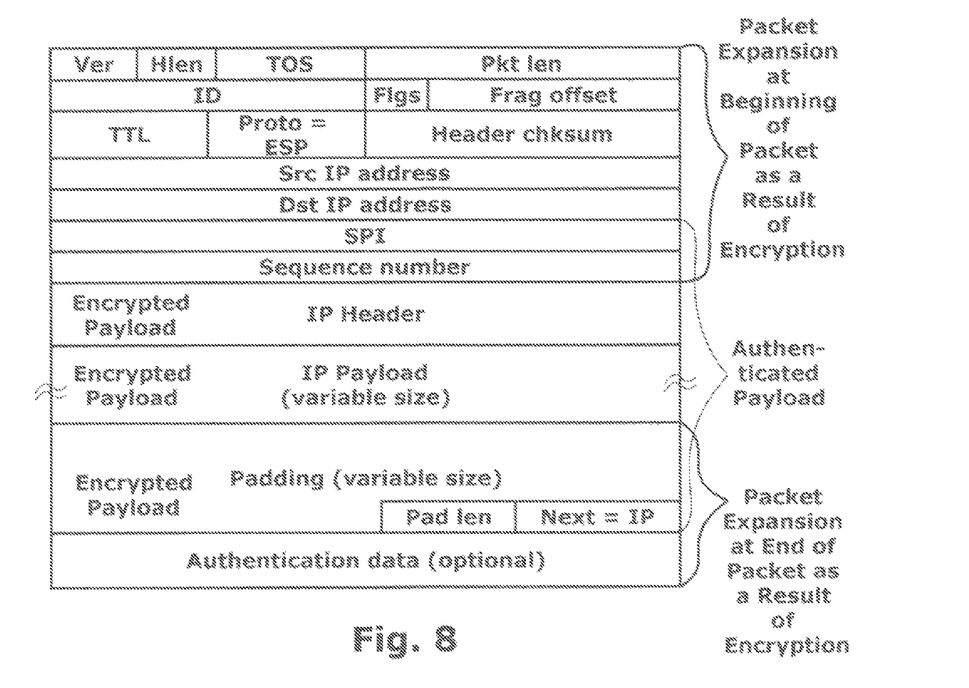
FIG. 8 is a diagram depicting IPSec ESP Tunnel Mode Pad Length and Next Protocol Field Location.

FIG. 8 is a diagram depicting IPSec ESP Tunnel Mode Pad Length and Next Protocol Field Location. Another consideration with input processing is the interaction of decryption and TCP/UDP checksum checking and IPv4 header checksum checking. Both these checksums include the packet length, and the protocol type also must be known in order to determine whether the received packet is TCP or UDP packet. However, these fields are actually located at the end of the IPsec encrypted packet and, hence, are not known until the entire packet has been received and decrypted. See FIG. 7 for the transport mode and FIG. 8 for tunnel mode location of protocol and pad length fields. An IPsec packet can have additional bytes padded to the packet and these pad bytes are not part of the payload covered by the checksums. Therefore, the pad bytes must be excluded from the checksum checking process in order to calculate the checksum on the included fields only.

One way to process the checksum is to store the entire packet in the IPsec output FIFO and only start the checksum checking once the packet length and protocol type are known. However, it is possible to process packets in a cut-through manner in order to reduce latency and packet buffering, without knowing the protocol type and packet length. The systems described above resolve this problem by speculatively starting off the TCP and UDP checksum checking state machines, by assuming all incoming packet belong to one of these protocols. If it is determined that the packet does not belong to either of these protocols, the checksum results are simply discarded and no checksum checking is done. If the protocol is either TCP or UDP, then the checksum check is performed.

In order to take into account the actual packet length (and excluding the pad length), the system buffers the last 256 bytes of the packet on chip. This size is used because the maximum pad length of an IPsec encrypted packet is 255 bytes. So by buffering the last 256 bytes on chip, the system guarantees that the pad length is known before the pad bytes are sent to the checksum checking logic.

Figure 9:
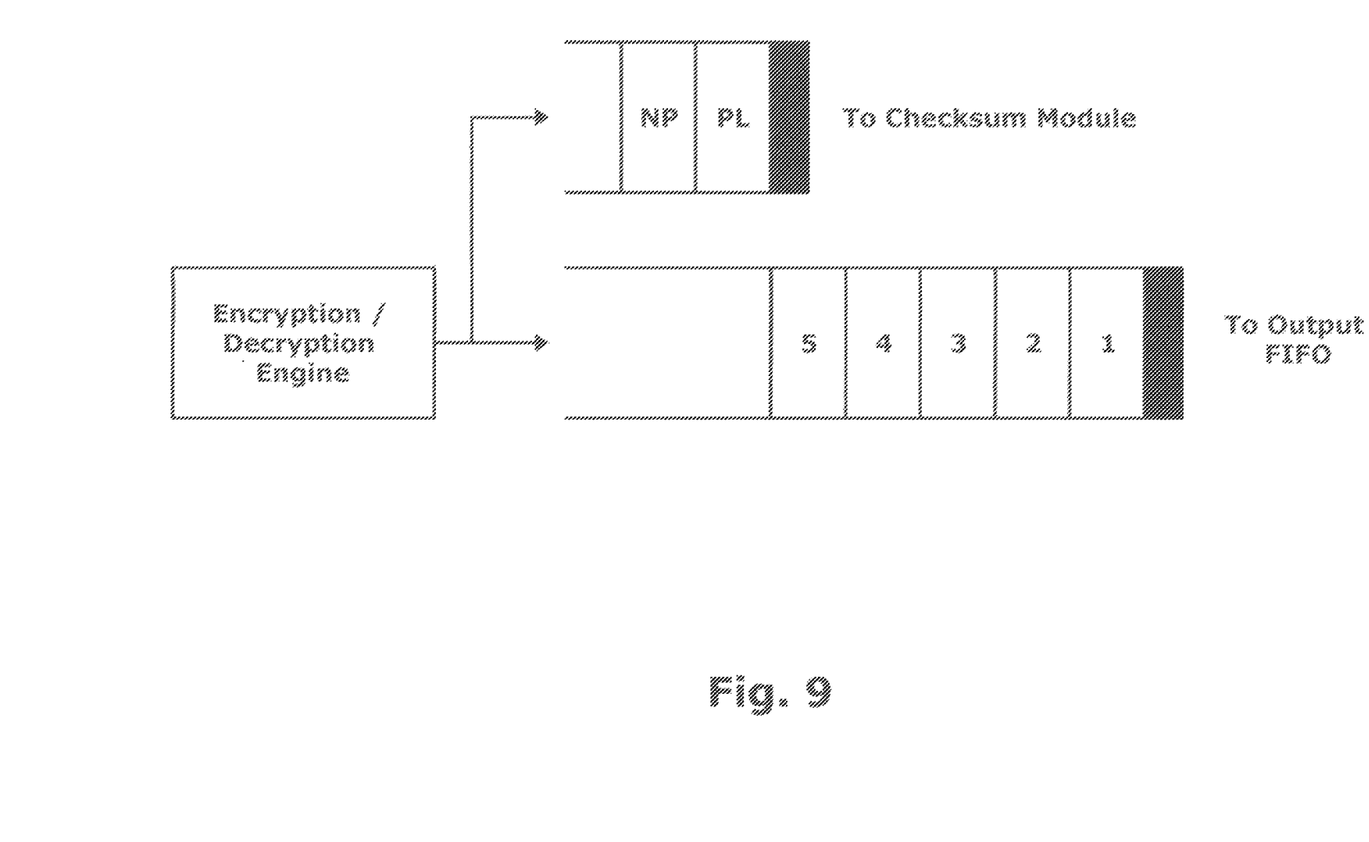
FIG. 9 is a schematic block diagram depicting how the pad length and next protocol fields can be passed to the checksum processing engine before processing any pad bytes.

FIG. 9 is a schematic block diagram depicting how the pad length and next protocol fields can be passed to the checksum processing engine before processing any pad bytes. In this manner, the checksum checking can be performed in a cut-through manner even if packets are encrypted. The Pad Length (PL) and Next Protocol (NP) fields are made available to the checksum module state machine along with the encryption data. The output FIFO collects 256 bytes or an end-of-packet block before the checksum reads the data, to insure that the PL and NP fields are available before the next pad bytes are read.

The system reduces the overall gate count of implementing IPsec and MACsec in an SoC with a configurable and shared Ethernet interface by utilizing the same engine to support both high speed and slow speed ports. Additionally, by interleaving and arbitrating at a block level, the system drastically reduces the input and output buffering.

Figure 10:
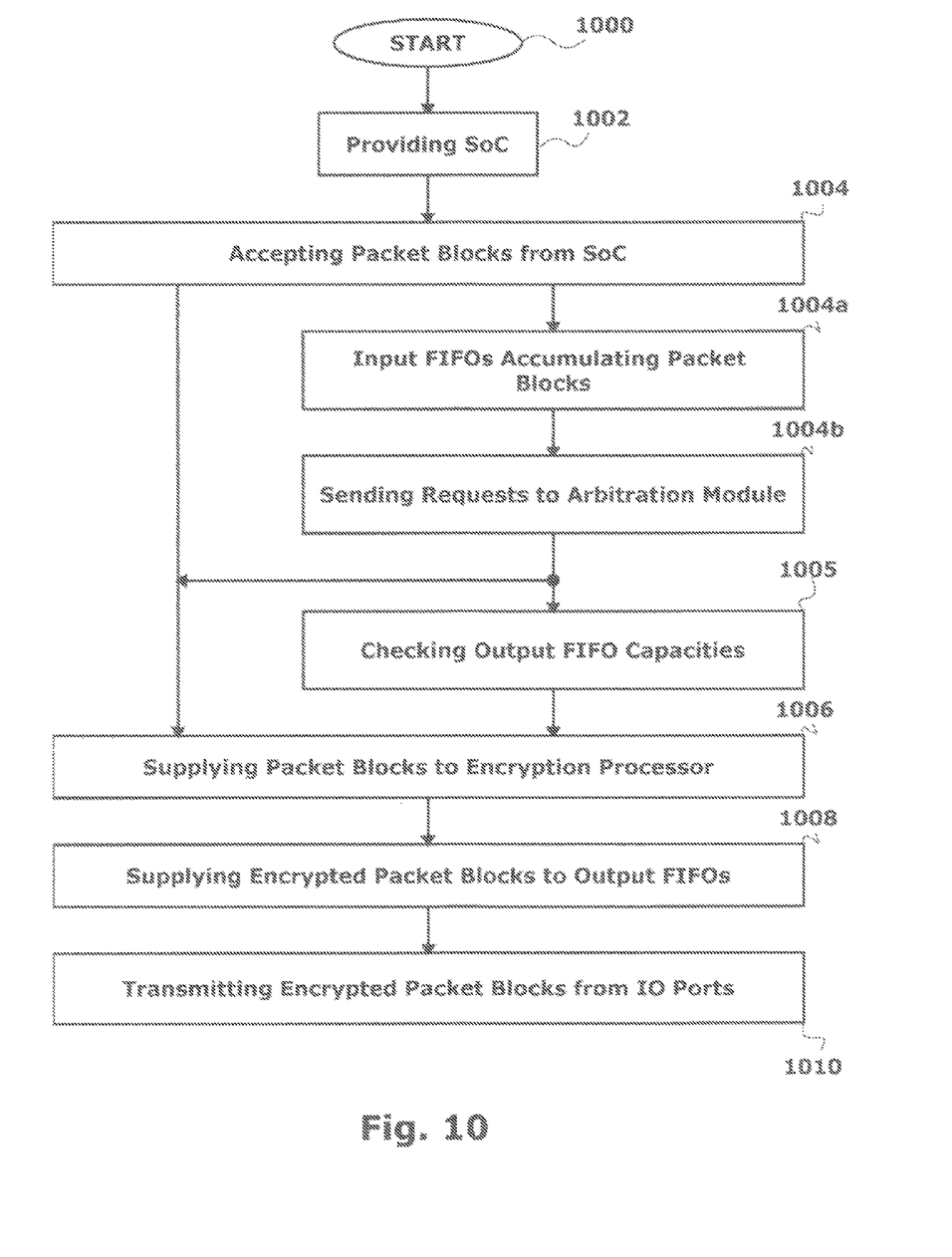
FIG. 10 is a flowchart illustrating a method for the cut-through encryption of packets transmitted via a plurality of IO ports in an SoC.

FIG. 10 is a flowchart illustrating a method for the cut-through encryption of packets transmitted via a plurality of IO ports in an SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 provides an SoC with a first plurality of input FIFO memories, an encryption processor, a first plurality of output FIFOs, each associated with a corresponding input FIFO, and a first plurality of IO ports, each associated with a corresponding output FIFO. Step 1004 accepts packets from the SoC at a tail of each input FIFO, at a corresponding input data rate. That is, each input FIFO may accept data at a unique data rate. In one aspect, Step 1004 accepts a packet block that is either a segment of m bytes, where m is fixed integer variable, or a partial block including the end of a packet. In another aspect, Step 1004 accepts IPsec ESP packets in a transport or tunnel mode.

Step 1006 supplies packet blocks to the encryption processor, from a head of each input FIFO, in a cut-through manner. Step 1008 supplies encrypted packet blocks to a tail of corresponding output FIFOs. Step 1010 transmits the encrypted packet blocks from a head of each output FIFO, via a corresponding IO port at a port speed rate effectively equal to the corresponding input data rate.

In one aspect, Step 1002 provides the SoC with an arbitration module, and accepting packets from the SoC in Step 1004 includes substeps. In Step 1004a a first input FIFO accumulates a first packet block. In Step 1004b the first input FIFO sends a request to the arbitration module. In one aspect, in Step 1005 the arbitration module checks the capacity of a first output FIFO associated with the first input FIFO. Then in Step 1006 the arbitration module sends the first packet block to the encryption processor in response to determining that the first output FIFO has the capacity to store an encrypted first packet block. In one aspect, the arbitration module receives a request from a plurality of input FIFOs and selects the first input FIFO in response to comparing the input data rates at which the input FIFOs accept packets from the SoC.

Figure 11:
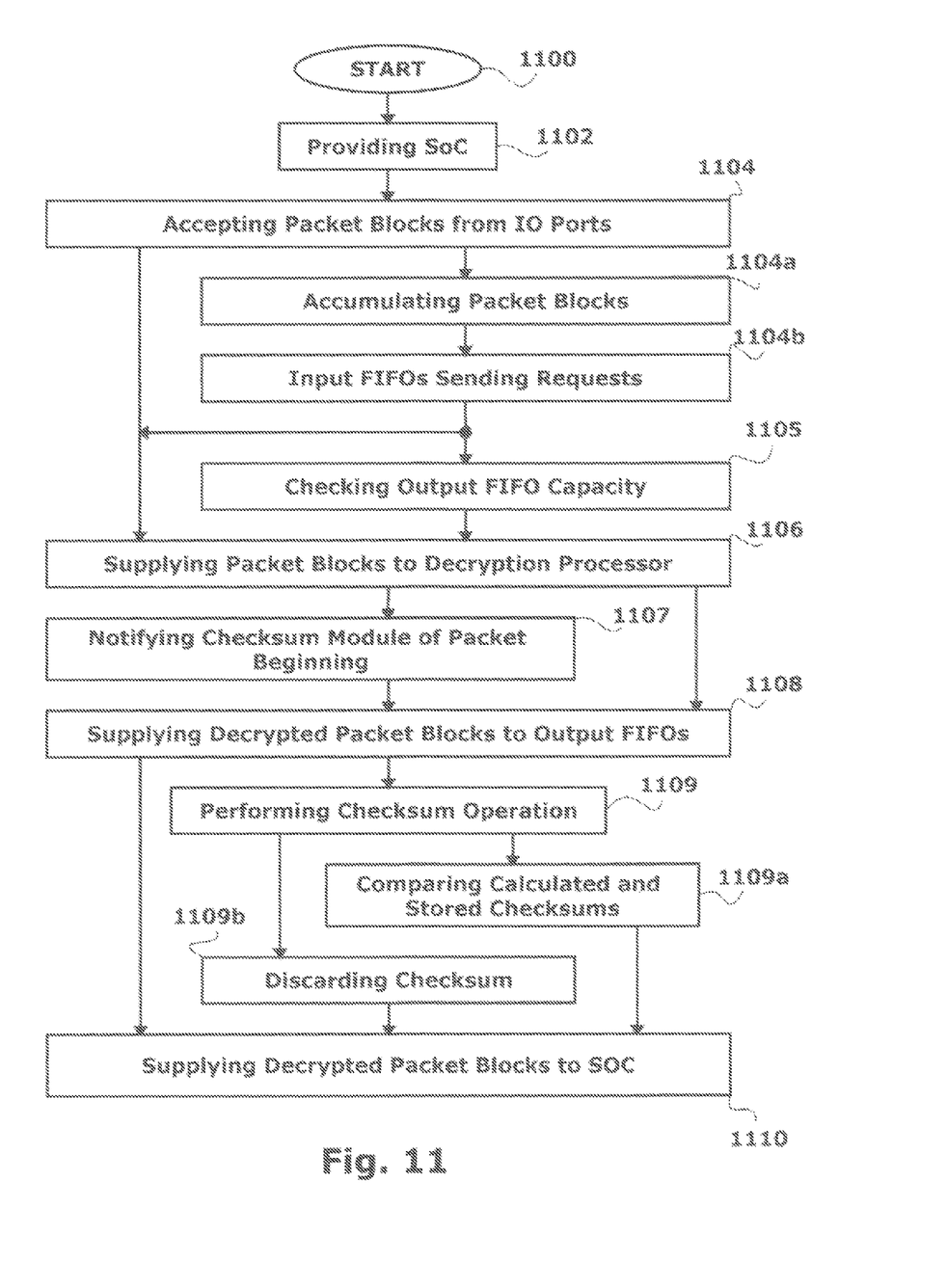
FIG. 11 is a flowchart illustrating a method for the cut-through decryption of packets received via a plurality of IO ports in an SoC.

FIG. 11 is a flowchart illustrating a method for the cut-through decryption of packets received via a plurality of IO ports in an SoC. The method begins at Step 1100. Step 1102 provides an SoC with a first plurality of IO ports, a first plurality input FIFO memories, each associated with a corresponding IO port, a decryption processor, and a first plurality of output FIFOs, each associated with a corresponding input FIFO. Step 1104 accepts packets via a corresponding IO port, at the tail of each input FIFO, at a corresponding port speed data rate. In one aspect, Step 1104 accepts a packet block that is either a segment of m bytes, where m is fixed integer variable, or a partial block including the end of a packet. In another aspect, Step 1104 accepts IPsec ESP packets in a transport or tunnel mode.

Step 1106 supplies packet blocks to the decryption processor, from a head of each input FIFO, in a cut-through manner. Step 1108 supplies decrypted packet blocks to a tail of corresponding output FIFOs. Step 1110 supplies the decrypted packet blocks from a head of each output FIFO, to the SoC at an output data rate effectively equal to the corresponding port speed data rate.

In one aspect, Step 1102 provides the SoC with an arbitration module, and accepting packets from the IO ports in Step 1104 includes substeps. In Step 1104a a first input FIFO accumulates a first packet block. In Step 1104b the first input FIFO sends a request to the arbitration module. In another aspect, in Step 1105 the arbitration module checks the capacity of a first output FIFO associated with the first input FIFO. Then in Step 1106 the arbitration module sends the first packet block to the decryption processor in response to determining that the first output FIFO has the capacity to store a decrypted first packet block. In one aspect, the arbitration module receives a request from a plurality of input FIFOs and selects the first input FIFO in response to comparing the input data rates at which the input FIFOs accept packets from the IO ports.

In another aspect, Step 1102 provides the SoC with a checksum module, and supplying packet blocks to the decryption processor in Step 1106 includes the decryption processor accepting a beginning of a first packet, associated with a first output FIFO. Then, in Step 1107 the decryption processor notifies the checksum module of the first packet beginning. In Step 1109 the checksum module performs a checksum operation on packet blocks associated with the first packet that are supplied to the first output FIFO.

For example, notifying the checksum module in Step 1107 may include the decryption processor determining if the first packet is a checksum protocol, such as TCP or UDP. Then, performing the checksum operation in Step 1109 includes the checksum module performing the following substeps. Step 1109a compares a calculated first packet checksum to a stored checksum in response to the first packet being a checksum protocol. Step 1109b discards the checksum in response to the first packet not being a checksum protocol.

In another aspect, Step 1102 provides the SoC with output FIFOs having a capacity of (x+1) bytes. Then, accepting the packet blocks from the IO ports in Step 1104 includes accepting packets with non-predetermined padding segments including a variable number of bytes, not exceeding x bytes. Notifying the checksum module in Step 1107 includes the decryption processor notifying the checksum module of the number of bytes in a first packet padding segment. Then, comparing the calculated checksum to the stored checksum in Step 1109a includes the checksum module excluding the first packet padding segment from the checksum calculation.

A system and method have been provided for cut-through encryption of packets transmitted via a plurality of SoC IO ports. Examples of particular message structures, processors, and hardware units have been presented to illustrate the invention. However, the invention is not limited to merely these examples. Other variations and embodiments of the invention will occur to those skilled in the art.

We claim:

1. A method for cut-through encryption of packets comprising:

receiving packets from a system-on-chip (SoC) at respective tails of a plurality of input first-in-first-out (FIFO) memories, wherein the packets are received at the plurality of input FIFO memories at a respective input data rates;

sending, by a first input FIFO memory of the plurality of input FIFO memories, a request to an arbitration module in response to a determination that a first packet block has accumulated at the first input FIFO memory;

checking, by the arbitration module, in response to receiving the request, a capacity of a first output FIFO memory, of a plurality of output FIFO memories, corresponding to the first input FIFO memory;

supplying, by the arbitration module in response to the determination that the capacity of the first output FIFO memory is sufficient to store an encrypted version of the first packet block, the first packet block of a plurality of packet blocks-comprising respective portions of the packets to an encryption processor from respective heads of the plurality of input FIFO memories in a cut-through manner to yield encrypted packet blocks, wherein a length of the packet blocks is smaller than a length of the packets, and the supplying comprises, in response to detection of simultaneous requests from two or more input FIFO memories of the plurality of input FIFO memories, selecting one of the two or more FIFO memories having a higher data rate based on a comparison of respective input data rates at which the two or more input FIFO memories receive the packets from the SoC; and supplying the encrypted packet blocks to respective tails of the plurality of output FIFO memories.

2. The method of claim 1, wherein the receiving the packets from the SoC further comprises receiving at least one of a segment of m bytes, where m is fixed integer variable, or a partial block including an end of a packet.

3. The method of claim 1, wherein the receiving the packets from the SoC further comprises receiving Internet Protocol Security (IPsec) Encapsulating Security Protocol (ESP) in one of a transport mode or a tunnel mode.

4. The method of claim 1, further comprising sending the encrypted packet blocks from respective heads of the plurality of output FIFO memories via IO ports respectively corresponding to the plurality of output FIFO memories, wherein the sending comprises sending the encrypted packet blocks at respective port speed rates corresponding to the input data rates.

5. A method for cut-through decryption of packets comprises:

accepting packets at respective tails of a plurality of input first-in first-out (FIFO) memories from corresponding IO ports, wherein the accepting the packets comprising accepting the packets at port speed data rates respectively corresponding to the IO ports;

sending, by a first input FIFO memory of the plurality of input FIFO memories, a request to an arbitration module in response to a determination that a first packet block has accumulated at the first input FIFO memory;

checking, by the arbitration module, in response to receiving the request, a capacity of a first output FIFO memory, of a plurality of output FIFO memories, corresponding to the first input FIFO memory;

supplying, by the arbitration module in response to the determination that the capacity of the first output FIFO memory is sufficient to store a decrypted version of the first packet block, the first packet block of a plurality of packet blocks to a decryption processor from respective heads of the plurality of input FIFO memories in a cut-through manner to yield decrypted packet blocks, wherein the packet blocks comprise portions of the packets having respective lengths that are smaller than a length of the packets, and the supplying comprises, in response to a determination that two or more input FIFO memories of the plurality of input FIFO memories have generated simultaneous requests, selecting one of the two or more input FIFO memories having a higher data rate based on a comparison of respective input data rates at which the two or more input FIFO memories accept packets via the IO ports; and supplying the decrypted packet blocks to respective tails of the plurality of output FIFO memories.

6. The method of claim 5, wherein the accepting the packets comprises accepting a packet block comprising at least one of a segment of m bytes, where m is fixed integer variable, or a partial block including an end of a packet.

7. The method of claim 5, wherein the accepting the packets comprises accepting Internet Protocol Security (IPsec) Encapsulating Security Protocol (ESP) in at least one of a transport mode or a tunnel mode.

8. The method of claim 5, wherein the supplying the packet blocks to the decryption processor further comprises supplying a beginning of a first packet associated with a first output FIFO memory of the plurality of output FIFO memories; and wherein the method further comprises:

notifying, by the decryption processor, a checksum module of the beginning of the first packet; and performing, by the checksum module, a checksum operation on packet blocks associated with the first packet that are supplied to the first output FIFO memory to yield a first packet checksum.

9. The method of claim 8, further comprising determining, by the decryption processor after performing the checksum operation, whether the first packet is a checksum protocol comprising one of a transmission control protocol (TCP) or a user datagram protocol (UDP); and wherein the performing the checksum operation comprises:

comparing the first packet checksum with a stored checksum in response to a determination that the first packet is a checksum protocol; and discarding the first packet checksum in response to a determination that the first packet is not a checksum protocol.

10. The method of claim 9, wherein the accepting the packets from the corresponding IO ports comprises accepting packets with non-predetermined padding segments comprising a variable number of bytes, wherein the variable number of bytes do not exceed x bytes, and wherein the plurality of output FIFO memories have a capacity of (x+1) bytes;

wherein the notifying the checksum module comprises notifying the checksum module of a number of bytes in a first packet padding segment of the non-predetermined padding segments; and wherein the comparing the first packet checksum with the stored checksum comprises excluding the first packet padding segment from the checksum operation.

11. The method of claim 5, further comprising supplying the decrypted packet blocks from respective heads of the plurality of output FIFO memories to a system-on-chip (SoC) at respective output data rates corresponding to the port speed data rates, respectively.

12. A system for cut-through encryption of packets comprising:
- a plurality of input first-in first-out (FIFO) memories respectively comprising a tail configured to receive packets from a system-on-chip (SoC) at a corresponding input data rate;
- an encryption processor comprising an input configured to receive packet blocks from respective heads of the plurality of input FIFO memories and an output configured to supply encrypted packet blocks in a cut-through manner, wherein the packet blocks comprise respective portions of the packets comprising sizes that are smaller than sizes of the packets, and wherein the encryption processor is configured to encrypt the packet blocks to yield the encrypted packet blocks;
- a hardware or software arbitration module configured to, in response to receiving substantially simultaneous requests from two or more input FIFO memories of the plurality of input FIFO memories, select a first input FIFO memory of the two or more input FIFO memories having a higher data rate based on a comparison of respective input data rates at which the two or more input FIFO memories receive packets from the SoC;
- a plurality of output FIFO memories configured to receive the encrypted packet blocks at respective tails; and
- wherein the arbitration module further comprises:
  - a first interface configured to receive requests from the plurality of input FIFO memories, wherein at least one of the requests from at least one of the plurality of input FIFO memories indicates an accumulation of a packet block at the at least one of the plurality of input FIFO memories,
  - a second interface configured to monitor respective output FIFO capacities of the plurality of output FIFO memories, and
  - a third interface configured to select an input FIFO memory of the plurality of input FIFO memories in response to a determination that a corresponding output FIFO memory of the plurality of output FIFO memories has sufficient capacity to store an encrypted packet block, of the encrypted packet blocks, corresponding to the input FIFO memory.

13. The system of claim 12, wherein the plurality of input FIFO memories are configured to receive packet blocks from the SoC, the packet blocks comprising at least one of a segment of m bytes, where m is fixed integer variable, or a partial block including an end of a packet.

14. The system of claim 12, wherein the plurality of input FIFO memories are configured to receive Internet Protocol Security (IPsec) Encapsulating Security Protocol (ESP) packets in at least one of a transport mode or a tunnel mode.

15. The system of claim 12, further comprising a plurality of IO ports, wherein an IO port of the plurality of IO ports is configured to receive at least a subset of the encrypted packet blocks from a head of a corresponding output FIFO memory of the plurality of output FIFO memories, and transmit at least the subset of the encrypted packet blocks at a port speed rate corresponding to an input data rate of the corresponding output FIFO memory.

16. A system for cut-through decryption of packets comprising:
- a plurality input first-in first-out (FIFO) memories comprising respective tails configured to accept packets via corresponding IO ports at corresponding port speed data rates;
- a decryption processor comprising an input configured to accept packet blocks from respective heads of the plurality of input FIFO memories, and an output configured to supply decrypted packet blocks in a cut-through manner, wherein the packet blocks comprise respective portions of the packets having sizes that are smaller than sizes of the packets, and wherein the decryption processor is configured to decrypt the packet blocks to yield the decrypted packet blocks;
- a hardware or software arbitration module configured to, in response to receipt of simultaneous requests from two or more input FIFO memories of the plurality of input FIFO memories, select one of the two or more input FIFO memories having a higher data rate based on a comparison of respective input data rates at which the two or more input FIFO memories accept the packets via the corresponding IO ports;
- a plurality of output FIFO memories configured to accept the decrypted packet blocks at respective tails;
- wherein the arbitration module further comprises:
  - a first interface configured to receive requests from the plurality of input FIFO memories, wherein at least one of the requests from at least one of the plurality of input FIFO memories indicates an accumulation of a packet block at the at least one of the plurality of input FIFO memories,
  - a second interface configured to monitor respective output FIFO capacities of the plurality of output FIFO memories, and
  - a third interface configured to select an input FIFO memory of the plurality of input FIFO memories in response to a determination that a corresponding output FIFO memory of the plurality of output FIFO memories has sufficient capacity to store an encrypted packet block, of the encrypted packet blocks, corresponding to the input FIFO memory.

17. The system of claim 16, wherein the plurality of input FIFO memories are configured to accept the packet blocks from the corresponding IO ports, wherein the packet blocks comprise at least one of a segment of m bytes, where m is fixed integer variable, or a partial block including an end of a packet.

18. The system of claim 16, wherein the plurality of input FIFO memories are configured to accept Internet Protocol Security (IPsec) Encapsulating Security Protocol (ESP) packets in at least one of a transport mode or a tunnel mode.

19. The method of claim 16, further comprising:
- a checksum module comprising a first interface configured to accept the decrypted packet blocks and a second interface configured to accept packet start notifications,
- wherein the decryption processor comprises an interface configured to supply the packet start notifications to the checksum module at respective beginnings of the packets, and
- wherein the checksum module is configured to perform a checksum operation on packet blocks associated with the respective packets supplied to an output FIFO to yield a first packet checksum.

20. The system of claim 19, wherein the decryption processor is configured to, after performance of the checksum operation, determine whether a first packet is a checksum protocol comprising one of transmission control protocol (TCP) or a user datagram protocol (UDP); and
- wherein the checksum module is configured to compare the first packet checksum to a stored checksum in response to a determination that the first packet is a checksum protocol, and discard the first packet checksum in response to a determination that the first packet is not a checksum protocol.

21. The system of claim 20, wherein the plurality of output FIFO memories have respective capacities of (x+1) bytes;
  wherein the plurality of input FIFO memories are configured to accept packets with non-predetermined padding segments including a variable number of bytes not exceeding x bytes;
  wherein the decryption processor is configured to notify the checksum module of a number of bytes in a first packet padding segment of the non-predetermined padding segments; and
  wherein the checksum module is configured to exclude the first packet padding segment from the checksum operation.

22. The system of claim 16, wherein the plurality of output FIFO memories are further configured to supply the decrypted packet blocks to a system-on-chip (SoC) from respective heads at output data rates corresponding to the port speed data rates.

* * * * *